United States Patent Office
3,441,929
Patented Apr. 29, 1969

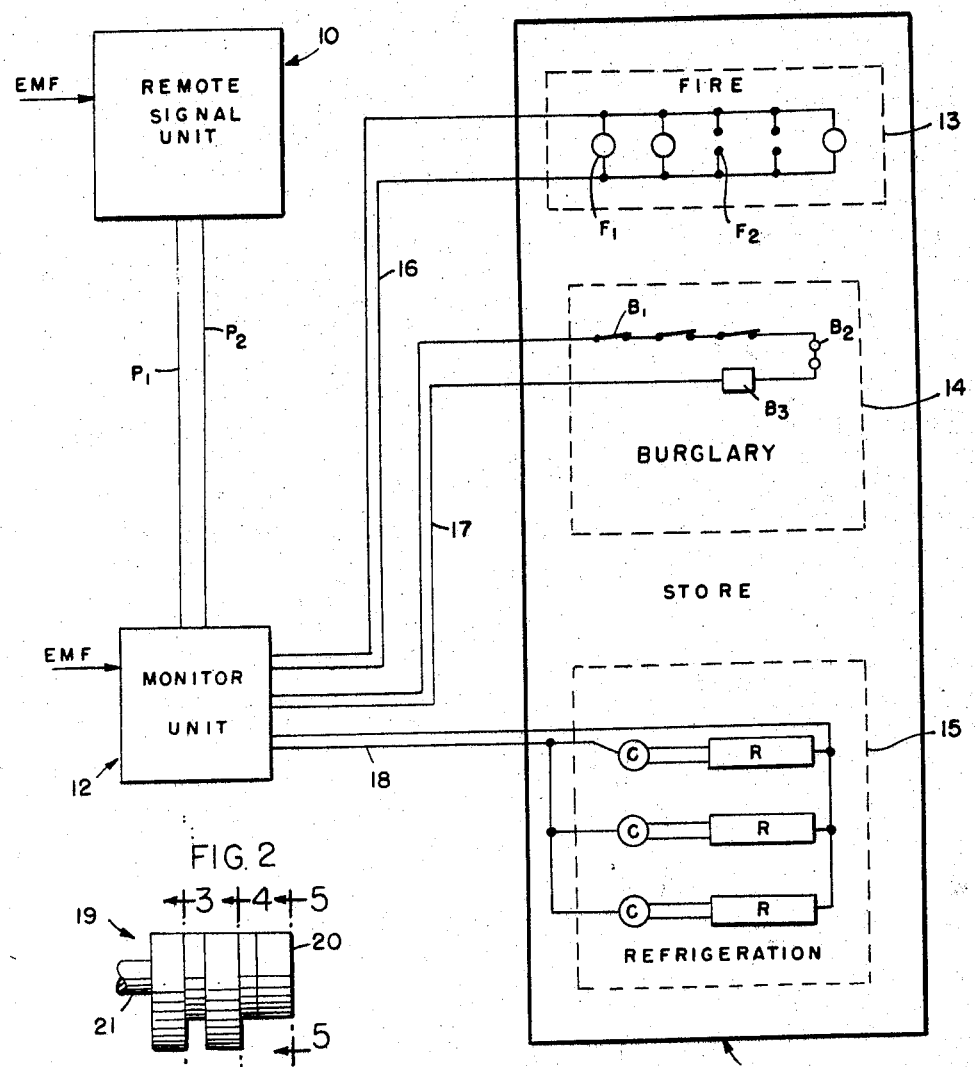
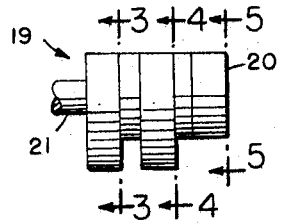
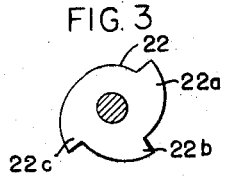
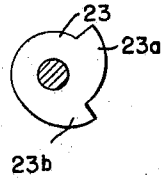
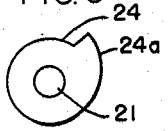

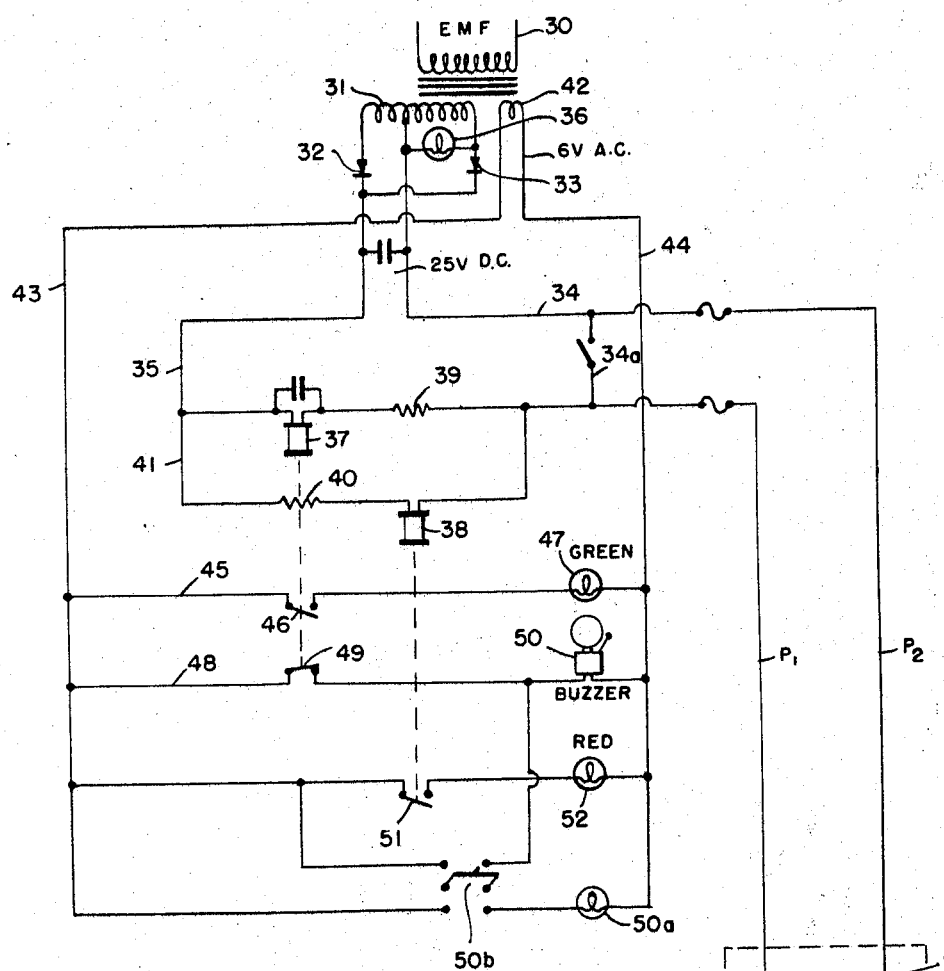
FIG. 6
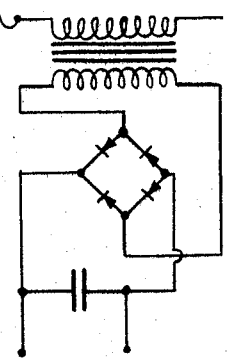
FIG. 8
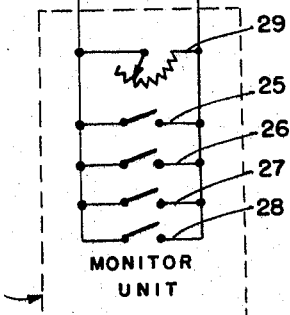

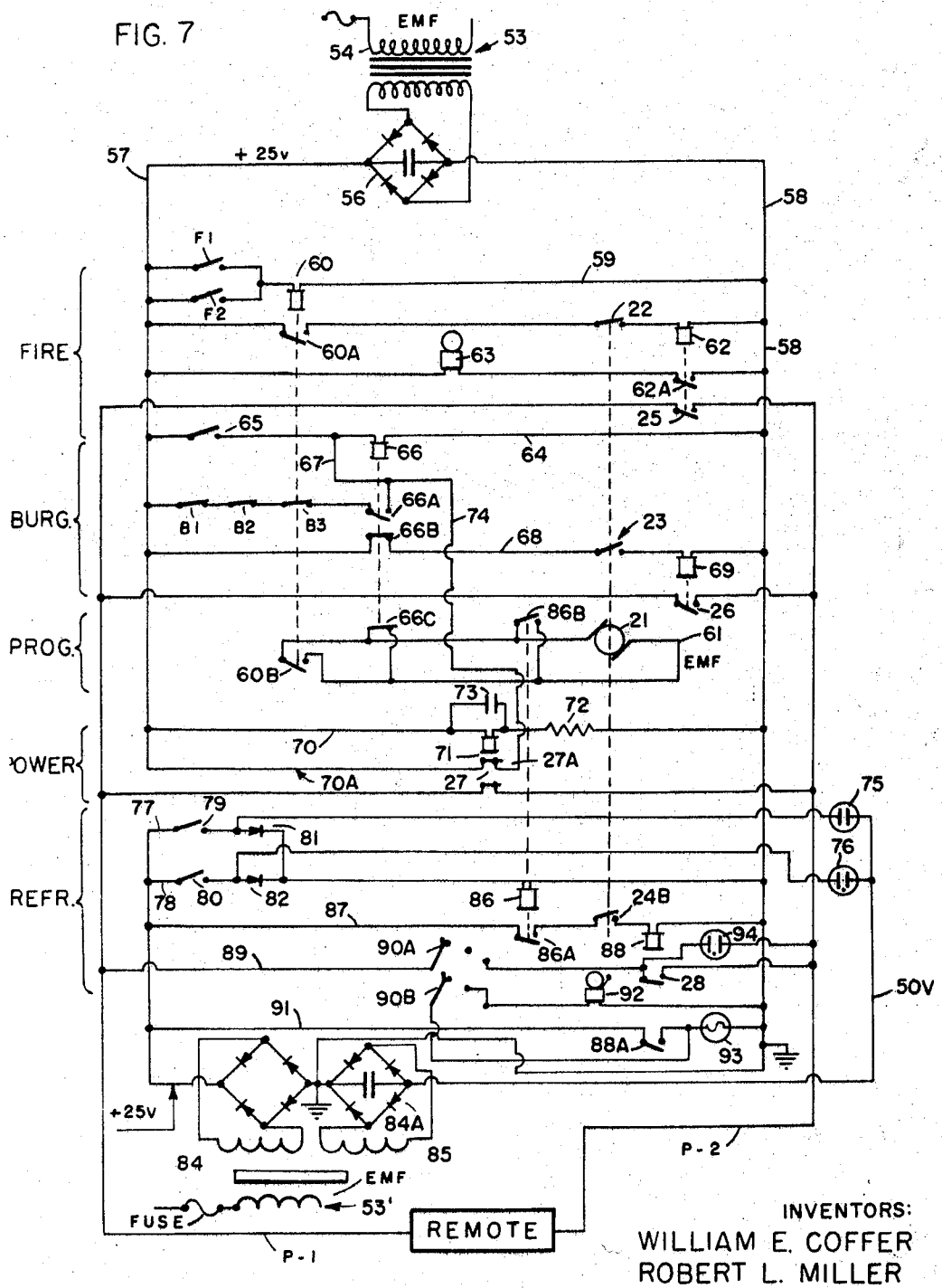

3,441,929
REMOTE REPORTING SYSTEM
William E. Coffer, Robert L. Miller, and John Shewan, Valparaiso, Ind., assignors to Ref-Con Corporation, Valparaiso, Ind., a corporation of Indiana
Filed Dec. 30, 1965, Ser. No. 517,538
Int. Cl. G08b 29/00
U.S. Cl. 340—409                 7 Claims This invention relates to a remote reporting system, and, more particularly to a system capable of reporting abnormal conditions, such as fire, the presence of a burglar, power failure, etc., at a point remote from the place of report.

The invention has particular application to grocery and retail stores, especially those utilizing refrigeration equipment. It is important to know when a given piece of refrigeration equipment is faulty so as to correct the mis-operation—otherwise valuable perishables may be lost. Such places of business also are attractive to burglars, and the system for reporting refrigerator failure can also be used advantageously to monitor unauthorized entry. Such unattended places as grocery stores at night often catch on fire—particularly where refrigeration compressors are utilized. Early report of such occurrences can effect incalculable savings. Thus, in one aspect, the invention has as an objective the provision of a system especially adapted for retail stores of the grocery type for the remote reporting of particular abnormal conditions.

It will be appreciated that the invention is capable of other uses in the remote reporting of abnormal conditions, such as the monitoring of processes in an industrial plant, i.e., temperature, pressure, concentration, etc., and such use is also contemplated as another object of the invention.

Still another object of the invention is to provide a remote reporting system which is capable of self-monitoring in that failure of power at the reported site is itself reported. In the specific environment previously referred to, it is not uncommon for burglars to cut power lines in an effort to avoid detection. Even though expedients are available for recognizing such an occurrence, usually these contemplate the employment of auxiliary power sources. According to the instant invention, the system is capable of reporting power failure at the reported site without the use of any auxiliary power pack such as batteries, for example.

Yet another object of the invention is to provide a unique system of reporting faults or abnormal conditions wherein the character of the report is varied according to the severity of the abnormal condition. For example, according to the invention as utilized in connection with a retail store, the complexity of the report increases as the severity increases—one signal per unit of time for a refrigeration failure, two signals per unit of time for a burglary, and three signals per unit of time for a fire. Furthermore, the system is so arranged that when two such abnormal conditions occur simultaneously, only the more severe is reported.

A further object of the invention is to provide a unique "on-site" reporting system useful in connection with refrigeration equipment, and the like. In this aspect, the invention makes use of novel electrical circuitry to confine higher voltage, yet makes possible positive and effective visual signalling of specific faults.

Other objects and advantages of the invention, both general and specific, may be seen in the details of construction and operation set down in this specification.

The invention is explained in conjunction with an illustrative embodiment shown in the accompanying drawing, in which:

FIG. 1 is a schematic diagram of the overall system as applied to a typical store;
FIG. 2 is a fragmentary elevational view of a portion of signal-creating apparatus capable of developing a different report program for different abnormal conditions;
FIGS. 3, 4 and 5 are views taken along the sight lines 3—3, 4—4, and 5—5 as applied to FIG. 2;
FIG. 6 is a wiring diagram of the remote signal unit of FIG. 1, along with a portion of the monitor unit of FIG. 1;
FIG. 7 is a schematic wiring diagram of essentially the remaining portions of the monitor unit of FIG. 1; and
FIG. 8 is an alternative form of power supply circuit useful in the invention.

In the illustration given and with particular reference to FIG. 1, the numeral 10 designates generally a remote signal unit which advantageously may be located in a telephone answering service or some location where constant supervision is provided. It will be appreciated that the store depicted by the block generally designated 11 is usually unattended at night and on week-ends, so that constant surveillance to recognize abnormal conditions is advantageous. This is achieved according to the instant invention through the use of a monitor unit generally designated 12 (usually mounted within the store, but shown exterior thereto in FIG. 1 for ease of understanding) and which is connected to the remote signal unit by means of electrical conducting lines $P_1$ and $P_2$. These advantageously may be leased telephone lines, but the power for the lines is provided by the user—for this purpose the symbol EMF is shown applied to the remote signal unit 10 and a second source of EMF is shown applied to the monitor unit 11.

Referring now to the block designated "store" in FIG. 1, it will be seen that three abnormalities are to be sensed and reported. Each of these is confined within a dashed line block for ease of understanding, with the block designated 13 having to do with fire, that designated 14 having to do with burglary, and that having to do with refrigeration being designated 15.

In the case of reporting on the presence of fire (the most severe abnormality), a pair of electrical conductors 16 lead from the monitor unit to various places within the store 11 and which are equipped with fire-sensing devices such as thermostats $F_1$ and sprinkler flow switches $F_2$. Each of the sensing devices $F_1$, $F_2$, etc. is disposed in parallel across the line 16 so that actuation of any such fire-sensing device causes current to flow in the line 16 and results in a suitable signal within the monitor unit 12 and at the remote signal unit. This is thereafter programmed and conducted by the lines $P_1$ and $P_2$ to the remote signal unit 10 for suitable action.

Relative to the burglary-sensing means 14, it will be seen that a pair of electrical conducting lines 17 lead from the monitor unit 12 to a plurality of burglar-sensing units $B_1$, $B_2$, $B_3$, etc. These may be hold-up buttons, key switches, proximity, micro, reed switches—all of which are normally closed and are arranged in electrical series, so that actuation of any such switch interrupts the flow of current in the line 17 and causes an appropriate signal to occur within the monitor unit 12 and at the remote signal unit.

A third pair of electrical conducting lines 18 lead from the monitor unit 12 to the refrigeration portion of the store, as at 15. Each refrigerator includes a case R and a compressor C which are sensed by appropriate thermostats (not shown). A suitable arrangement for sensing refrigeration equipment can be seen in U.S. Patent 2,994,858 and in our copending application Ser. No. 389,998, filed Aug. 17, 1964, and reference may be made to that application for additional details of construction and operation. The usual thermostat associated with the refrigeration section 15 is adapted to close upon the occurrence of an abnormal condition and cause current to flow in the lines 18 to create a suitable signal within the monitor unit 12. This in turn is relayed by the lines $P_1$ and $P_2$ to the remote signal unit 10.

For the purpose of creating different signals for transmission over the lines $P_1$ and $P_2$ to the remote signal unit 10, a cam-equipped motor may be advantageously employed in connection with small electrical switches. The cam portion of the motor is seen in FIG. 2 and is designated generally by the numeral 19. The cam block 20 is seen to be mounted on a shaft 21 and the three cam portions corresponding respective to fire, burglary and refrigeration abnormalities are designated 22, 23 and 24 (being seen in profile in FIGS. 3–5). In FIG. 5, the cam contour corresponding to a refrigeration fault is seen to include a single lobe 24a. Energization of the thermostats in the refrigeration section 15 causes current to flow in the line 18 to rotate the motor associated with the shaft 21, which in turn rotates the cam 24. Each rotation of the cam block 20 results in a rotation of the cam 24 with the lobe 24a closing an appropriate switch.

The cam 23 of the cam block 20 which is responsive to a burglary signal carries two cam lobes 23a and 23b. The lobe 23a is seen to be aligned with the lobe 24a so that should a signal also be delivered over the lines 18 at the same time a burglary is sensed, the information relative to refrigeration is masked by the double signal per revolution emanating from the cam 23.

In FIG. 3, the cam 22 is seen to be equipped with three lobes 22a, 22b and 22c, with the lobes 22a and 22b corresponding in placement with the lobes 23a and 23b of the cam 23. Thus a signal for fire, being more severe than that for a burglary, would mask the burglary signal. Also a false signal could not be transmitted, i.e., burglary (2 signal) and refrigeration (1 signal) could not be misinterpreted as a 3-signal fire alarm.

The means for reporting at the remote signalling unit 10 the information developed at the monitor unit 12 will now be described in conjunction with FIG. 6. In FIG. 6, the telephone lines are again designated $P_1$ and $P_2$ and are seen to lead to a series of normally open switches or contacts as at 25, 26, 27 and 28 in the monitor unit 12. In the particular illustration given, these correspond to contacts closable upon the occurrence of fire, burglary, power failure and refrigeration fault. The power failure contemplated here is that of the second source of EMF shown coupled to the monitor unit 12 in FIG. 1. It will be immediately appreciated that the switches or contacts 25–28 may be conditioned to close upon the occurrence of abnormalities other than those just listed.

Also provided in the monitor unit 12 and disposed in electrical parallel with the switches 25–28 is a rheostat 29 useful in controlling the value of the current flowing in the leased telephone lines $P_1$ and $P_2$.

The source of current for operating the remote signal unit 10 is seen at the upper central portion of FIG. 6 and is designated EMF as applied to the primary of a transformer. The EMF source may be commercial voltage, i.e., 115 volts, 60 cycles, single phase current. The voltage from the transformer primary 30 is stepped down in the first secondary 31 and is rectified by means of diodes 32 and 33. Full wave rectification is provided by connecting one of the output lines 34 to the center tap of the secondary 31 while the other output line 35 is attached to the extremities of the secondary 31. Disposed across half of the transformer secondary 31 is a white report light 36 which gives a continuous signal to the supervisor that current is being delivered to the remote signal unit 10. Whenever the white light 36 is out, it is immediately recognized that the system cannot function because of power failure at the remote signal unit 10.

It will be realized that the output lines 34 and 35 ultimately conduct current to the telephone lines $P_2$ and $P_1$, respectively. Interposed in the output line 35 are a pair of relays 37 and 38 equipped with load-limiting resistors 39 and 40, respectively. The relay 37 is a low current relay, so that with the usual setting of the rheostat 29, sufficient current flows through the relay 37 to energize the same. However, with this same usual setting of the rheostat 29, insufficient current flows through the parallel branch 41, i.e., through the resistance 40 and relay 38, to energize the latter. Thus, the relay 38 is responsive only to the closing of one or more of the switch contacts 25–28 to signal the occurrence of an abnormality at the monitor unit. The secondary 31 is so constructed and arranged relative to the primary 30 as to develop about 160–180 volts DC across the output lines 34 and 35.

A second secondary 42 is provided in association with the primary 30 to develop 6 volts alternating current across the output lines 43 and 44. The output lines 43 and 44 have connected thereacross a first sub-circuit line 45 which includes a relay contact 46 and a green light 47.

Thus, when the white light 36 is on, indicating that the remote signal unit 10 is powered, sufficient current flows though the telephone lines $P_1$ and $P_2$ and the rheostat 29 to hold the relay 37. A test-reset switch 34a closes the normally open relay contact 46, permitting 6 volt alternating current to flow through the green light 47 to energize the same. When the green light 47 is on, the attendant at the remote signal unit knows that the telephone lines are uninterrupted. Should one of the telephone lines $P_1$ or $P_2$ become open, no current will flow through the relay 37, whereupon the relay contact 46 opens and the green light goes out. This is an immediate signal to the attendant at the remote signal unit that something is amiss with the telephone lines $P_1$ and $P_2$.

A second indicating means is provided relative to the integrity of the telephone lines $P_1$ and $P_2$, this being in the form of a second sub-circuit line 48 arranged in parallel with the first sub-circuit line 45. The sub-circuit line 48 includes a normally closed contact 49 associated with the relay 37 and a buzzer 50. Thus, when the telephone lines are intact and the relay 37 is actuated, the relay contacts 49 are open, whereupon no 6 volt current flows through the buzzer 50. Upon break in the phone line, the relay 37 is deenergized and the contacts 49 closed to flow current through the sub-circuit line 48 to the buzzer 50 and energize the same.

When one or more of the switches 25–28 close, increased current flows through the lines $P_1$ and $P_2$, raising the voltage across the second relay 38. This relay thereupon closes its contacts 51 to flow 6 volt current to a red light 52 and also through the buzzer 50. This then results in both a visual and an audible signal to the attendant that something is amiss at the monitored station, the store 11. The red light 52 and buzzer 50 are energized in accordance with the manner the switches 25–28 are closed, and the closing of these switches is programmed according to the operation of the cams 22–24.

A fourth lamp 50a is provided in the remote unit 10 which may be amber in color and which is used in conjunction with a double-pole, double-throw switch 50b to indicate the silencing of the buzzer 50 on a recognized and reported fault. The amber light 50a indicates the switching off of the buzzer 50 except in a phone-line-break condition when the buzzer 50 may be silenced only by unplugging power to the remote unit. In FIG. 8, an alternative power rectifier is shown which uses a 4 diode bridge instead of the center tap transformer for connection to lines 34 and 35.

The manner in which the switches 25–28 are closed will now be described in conjunction with the monitor unit 12 as depicted schematically in FIG. 7.

Referring now to FIG. 7, the numeral 53 designates generally a transformer provided within the monitor unit 12 and which is seen to be equipped with a primary 54 coupled to the second source of EMF shown on FIG. 1. The secondary 55 of the transformer 53 is seen to be equipped with a bridge network 56 for full wave rectification of the signal impressed across the secondary 55 so as to develop a 25 volt DC voltage across the output lines 57 and 58. Extending across the lines 57 and 58 is a sub-circuit line 59 which includes the various fire-sensing elements $F_1$, $F_2$ arranged in parallel. Also interconnected in the line 59 in series with the parallel arranged fire-sensing units $F_1$, $F_2$, etc., is a fire-responsive relay 60. Thus, when any one of the fire-sensing elements $F_1$, $F_2$, etc. closes in response to increased temperature, abnormal rate of increase in temperature, or the like, current flows through that particular fire-sensing element and the relay 60 to actuate the same and to close a first set of relay contacts 60a associated with the relay 60. Also the actuation of the relay 60 results in the closing of a second set of relay contacts 60b associated with the relay 60.

The contacts 60b are in the portion of the showing in FIG. 7 designated PROG corresponding to the programmer associated with the various cams shown in FIGS. 2-5. The programmer circuit is generally designated 61 and is seen to include a motor 21' coupled to a source of EMF, i.e., 115 volts AC, 60-cycle, single phase current. With the closing of the contacts 60b, the motor 21' is energized to turn the shaft 21 and thus the cam block 20. Rotation of the cam block 20, and more particularly the cam 22, results in closing a first electrical switch 22d, seen to be arranged in electrical series with the first relay contacts 60a. As previously explained, the switch 22d closes three times for each revolution of the shaft 21, and in so doing actuates a second fire relay 62 three times each revolution of the shaft 21. The intermittent operation of the second fire relay 62 results in an interrupted program of closing the first and second relay contacts 62a and 25 associated with the second fire relay 62. The closing of the first relay contact 62a energizes the buzzer 63 arranged in series with the first relay contact 62a so as to develop an aural signal at the monitor unit 12. The intermittent closing of the second relay contacts 25 permits additional current to flow through the phone lines $P_1$ and $P_2$ so as to intermittently energize the relay 38 (see FIG. 6) and thus develop a triple signal at the remote signal unit 10.

The bulrglary portion of the monitor unit will now be described in conjunction with the portion of FIG. 7 just below that having to do with fire reporting. For this purpose, a sub-circuit line designated 64 is connected across the output lines 57 and 58 which are coupled to 25 volts D.C. The line 64 has a momentary start button 65 and a first burglary relay 66 arranged in series as part of the line 64. The relay 66 has associated therewith a first set of contacts (normally open) and which are designated 66a, and a second set of contacts 66b. A third set of contacts 66c are also provided on the relay 66. It will be seen that the first set of relay contacts 66a is arranged in electrical series with the various burglary-sensing devices $B_1$, $B_2$, $B_3$, etc., and that the sub-circuit including the relay contacts 66a and the burglary-sensing units $B_1$, $B_2$, $B_3$, that sub-circuit being designated 67, is arranged in parallel with the push-button 65. Thus, upon depression of the push-button 65, current temporarily flows through the line 64 to actuate the relay 66. When this occurs, the relay contacts 66a close to provide an alternate path for current flowing through the relay 66 when the push-button 65 is released. Thus, current continually flows in the sub-circuit 64 and sub-circuit 67 until there is either power failure or one of the burglary-sensing devices $B_1$, $B_2$, $B_3$ is actuated to open the same.

While the relay 66 is energized—the burglary-sensing devices $B_1$-$B_3$ being untripped—the current flowing through the relay 66 maintains the relay contacts or switch 66b in open condition. Thus, no alternate path is provided around the rheostat 29 (see FIG. 6). With tripping of one of the burglary-sensing devices $B_1$-$B_3$, the relay 66 is deenergized and the relay contacts 66b return to the closed condition seen in FIG. 7, thereby permitting current from the line 57 to flow to the line 58 through the sub-circuit line 68 carrying the switch 66b. The sub-circuit line 68 also includes a switch 23c operated by the cam 23 and a second burglary relay 69. The deenergization of the first burglary relay 66 results in the closing of the third relay contacts 66c (see the programmer section of FIG. 7), whereupon EMF is applied to the motor 21' to rotate the shaft 21. This in turn results in closing the small electrical switch 23c twice each revolution of the shaft 21 and applying current to the second burglary relay 69 to develop what might be termed a "double signal" at the remote signal unit 10. This is achieved through the intermittent closing of relay contact 26 associated with the second burglary relay 69. The relay contacts, i.e., switch 26, are seen to be disposed in parallel to the switch 25 and across the phone lines $P_1$ and $P_2$ so as to intermittently actuate the relay 38 in the remote signal unit 10.

A third phenomenon which the system is capable of reporting is that of power failure at the monitor unit 12. This is performed through the use of a sub-circuit line 70 carrying a power failure relay 71. When the relay 71 is deenergized, the relay contacts 27 close (from the configuration shown) and thus permit current to flow continuously through the phone lines $P_1$ and $P_2$. This results in a continuous buzzing by the buzzer 50 and a continuous glowing of the red lamp 52 at the remote signal unit of FIG. 6. From this, it will be seen that no auxiliary power source is required at the remote unit to signal that there is a power failure. In the past, many warning systems required stand-by power sources such as batteries to indicate that the principal source of power at the store had failed. Ordinarily, power flows through line 70, power failure relay 71, and resistor 72 to ground.

It will be appreciated that commercial electricity is utilized to power the monitor unit 12, and such a source is subject to temporary failure or at least voltage drops due to unexpected loads that false failure signals could be reported, if any temporary failure of EMF were to be reported. To guard against false reports of this nature, we equip line 70, with an R-C circuit made up of resistance 72 and capacitance 73 connected about the coil of the power rely 71. Thus, when there is temporary drop or cessation in commercial voltage i.e., the EMF shown at the top of FIGURE 7, the capacitance 73 discharges to ground for a predetermined length of time (depending upon the time constant of the R-C circuit) to maintain the relay #71 in the energized condition. This prevents the relay 71 from opening on a momentary power failure and signaling same. For example, we employ a 10 microfarad condenser and a 220 ohm resistor to develop a time delay of the order of $\frac{1}{10}$ second.

Simultaneously with delivering current to relay 71, the condenser 74 also delivers current to the burglary relay 66 (via $B_1$, $B_2$, $B_3$ and 66a to maintain that relay in energized condition for the fraction of a second the EMF is reduced).

It will be appreciated that a temporary cessation or reduction in voltage could result in deenergization of the first burglary relay 66. Thus, when power returns within a fraction of a second, the power sub-circuit line 70 would again be energized to remove the continuous warning signal from the buzzer 50 and the red warning light 52, but the attendant opening of the first set of contacts 66a (by virtue of power cessation—deactivating relay 66) would prevent current from flowing through the line 64—it being appreciated that the reset button 65 is normally open. This then would set up a burglary signal, since the contacts 66b and 66c would be closed to energize the motor 21' and the second burglary relay 69. In other words, a temporary power failure would result in a burglary signal being transmitted over the phone lines $P_1$ and $P_2$ if provision were not made for temporarily powering the first burglary relay 66 in the event of a temporary power failure or temporary reduction in EMF. In the event the power interruption is of greater duration than the R-C circuit delay, an additional feature of the circuit is provided through the R-C time delay in relay #71 becoming energized after re-establishment of power. This is accomplished through line 70A, normally closed contacts 27A, thence through lines 74 and 67 to energize relay coil 66. Relay 66 will then be held closed by switches $B_1$, $B_2$, $B_3$ and contacts 66A through line 67. The duration of the R-C delay, i.e., approximately 1/10 second, of relay 71 is sufficient time to allow relay coil 66 to become energized, thus preventing a false burglar signal from being transmitted to the remote unit.

The fifth portion of the monitor unit diagram, i.e., the portion nearest the bottom of FIG. 7, will now be described, and it will be seen from the legend applied to the left-hand portion of the diagram that this pertains to the refrigeration monitoring section of the system.

Inasmuch as the refrigeration equipment operates continuously and is relatively unsupervised even when the store 11 is open, it is highly desirable to provide means for indicating to store personnel that a refrigeration unit is malfunctioning, and, more especially, just which unit is at fault. In the past, this has posed a problem, since it is desirable to provide such an "on site" signal using glow discharge tubes such as neon tubes as provided at 75 and 76 adjacent the lower right-hand corner of FIG. 7. Such tubes require higher voltage than that normally employed in warning devices, i.e., upwards of 75 volts DC. In the inventive arrangement, the tubes 75 and 76 are provided as part of the monitor unit which can be advantageously installed in the office of the manager of the store 11. As such, higher voltage can be utilized without the need of running a special conduit to the various refrigeration units. For example, the only lines which need be external of the monitor unit 12 are those designated 77 and 78 which carry thermostats 79 and 80 associated with a given refrigeration unit and compressor. It will be appreciated that additional thermostats may be added in parallel as there are units to be monitored. One end of each line 77 and 78 is connected to a first output line 57′, while the other end of each line 77 and 78 is connected to the other output line 58 (ground as at 58′) through a diode as at 81 and 82, respectively. The interposition of the diodes 81 and 82 is utilized to prevent feedback from one neon tube 75 to the other neon tube 76, or vice versa, as the case may be. The neon tubes 75 and 76 are seen to be connected to the lines 77 and 78 ahead of the rectifiers 81 and 82, and are in turn coupled to an output line 83 which is at a voltage below ground. For example, the line 57′, being powered from the first secondary 84, may be at +25 volts, while the base of its bridge network 84a is at ground. The base of the bridge network 85a associated with the second secondary 85 is at ground, while the low voltage end of the bridge network 84 would be valued at −50 volts DC. Thus, effectively 75 volts are applied across the neon tubes 75 and 76, and provision is made in the form of diodes 81 and 82 against carry-over or feedback from one neon tube to the other. So, it will be recognized that the second secondary 85, along with the neon tubes and the wiring for the neon tubes, can all be confined within the monitor unit so as to effect substantial savings in the use of conduits throughout the store 11.

We prefer to provide different transformers 53 and 53′ for the fire, burglary and power failure subcircuits on one hand and for the refrigeration sub-circuit on the other. Transformer 53 is fused from the monitor panel door front and is accessible from the front for ease of replacement. Transformer 53′ is fused from inside the locked door of the monitor to prevent unauthorized fuse removal, and replacement must be made through the use of a key.

Actuation of any one of the thermostats 79, 80 results in current flow through the first refrigerator relay 86, energizing the same to close its relay contacts 86a and 86b. The relay contacts 86b permit EMF to be applied to the motor 21′, and thus rotate the shaft 21. The rotation of the shaft 21 actuates the cam 24, and the lobe 24a thereof intermittently closes the switch 24b provided in the sub-circuit line 87, which also carries the relay contacts 86a. Also interposed in series in the line 87 is a second refrigerator relay 88, so that this relay is energized intermittently, i.e., once each revolution of the shaft 21, for the purpose of developing a signal in the remote signal unit 10. This is achieved by the first set of relay contacts 28 associated with the relay 88, selector switch 90A position 3, and which are seen to be connected across the phone lines $P_1$ and $P_2$ via the line 89 which carries the relay contacts 28. Also a neon lamp #9A connects to line 89 and indicates at the monitor unit that the phone lines $P_1$ and $P_2$ are functioning properly. The three position selector switch shown as section 90A and section 90B, is provided for the convenience of the attendant at the monitor unit. Position 3 or night position is provided for the reporting of refrigeration faults at the remote unit 10 as well as at the monitor unit 12. A local audible signal, bell or buzzer 92, and a warning light #93 are privided for alerting any personnel of a refrigeration malfunction at the monitor unit. Position 2 or DAY position is provided for reporting any refrigeration malfunction at the local monitor unit #12. The audible bell or buzzer 92 and the warning lamp 93 would signal any refrigeration fault. Position 1 is provided for the attendant to silence the bell or buzzer, the warning lamp would continue to signal until the refrigerator fault has been corrected. The local warning signal would be carried through line 91 and relay contacts 88A of the relay 88 to lamp #93 and through the selector switch section #90B for selection of position 1—SILENT, position 2—DAY, or position 3—NIGHT, to the bell or buzzer designated #92.

*Operation*

The illustrated system is adapted to report five different abnormal conditions. As indicated generally in FIG. 1, these are fire, burglary and refrigeration faults at a store. It will be appreciated that a greater or lesser number of abnormalities can be reported relative to other environments as desired. Additionally, the system monitors the separate source of EMF connected to the store, and the integrity of the leased phone lines $P_1$ and $P_2$ connecting the monitor unit 12 (at the store) with the remote signal unit 10. As mentioned previously, the remote signal unit 10 may be at a telephone answering service. It should be appreciated, however, that the power utilized in the operation of the system is independent of that provided by the telephone company, a separate source of EMF being provided for the remote signal unit 10.

Reference to FIG. 6 reveals that the warning circuit operates on current differentials, the normal current flow being governed by the setting of the rheostat 29 connected across the phone lines $P_1$ and $P_2$. These lines are normally connected to a source of 180 volts DC as provided by the transformer secondary 31 and rectifying devices 32 and 33. When all is normal, a small current flows in the phone lines, only sufficient to energize the first relay 37 but insufficient to energize the second relay 38. The contacts 46 of the first relay 37 permit current to flow through a green lamp 47, indicating that the phone lines are intact. A white light 36 indicates that power is being supplied to the remote signal unit 10.

When any one of the switches 25–28 (in reality, contacts provided on relays at the monitor unit 12) is closed, additional current is permitted to flow because of the shunting of the rheostat 29. This additional current is sufficient to energize the relay 38, and this results in closing of the normally open relay contact 51, delivering current to the buzzer 50 and the red light 52. The development of both an audible and a visual signal quickly indicates to the supervisor that a fault is occurring in the system. The green light will go out and the buzzer will be energized in the event of phone line break, while the green light will remain on and the red light additionally will go on along with buzzer operation should a fault occur at the reported-on site—as by closure of any one or more of the switches 25–28.

The switches 25–28 are provided as part of relays as depicted schematically in FIG. 7. The switch 25 is the second set of contacts on the relay 62 provided as part of the fire-sensing system seen in the upper section of FIG. 7. When one of the fire-sensing devices $F_1$ or $F_2$ closes, the primary relay 60 is energized to actuate the motor 21'. This rotates the shaft 21 and the cam 22 attached thereto intermittently closes a microswitch 22d delivering current to the relay 62. This results in intermittently closing the switch 25 to generate three burst signal at the remote signal unit 10.

The switch 26 is associated with the burglary-sensing unit and is seen to be the contact associated with the second burglary relay 69. The relay 69 is intermittently energized—double bursts—by intermittent closing of the microswitch 23c under the influence of the motor 21'. The actuation of the motor 21' is brought about by the closing of the contacts 66c associated with the relay 66. The relay 66 is normally energized so as to maintain the contacts 66c in open condition. The first burglary relay 66 is maintained energized by current flow through the path developed by the lines 66 and 67, which include the first set of relay contacts 66a and the various burglary sensors $B_1$, $B_2$, $B_3$, etc. Thus, tripping of any one of the burglary sensors $B_1$, $B_2$, $B_3$ results in opening the circiut energizing the first burglary relay 66. The first burglary relay 66 is initially energized by a reset button 65 which is temporarily closed to establish current flow through the first burglary relay 66, after which the relay becomes self-energized.

Any attempt on the part of a would-be burglar to frustrate the operation of the warning system by cutting power is avoided by having a power failure circuit provided in the monitor unit 12. This embodies a relay 71 which is maintained energized by current flow whenever current is provided to the monitor unit 12. Upon failure of current, the relay #71 becomes de-energized, whereupon the switch 27 closes to send a continuous signal to the relay 38 at the remote unit #10. Upon resumption of power, the relay 71 is again energized to open the switch 27 and remove the continuous signal from the remote unit 10. When power has been resumed the R-C delay of relay 71 (capacitor 73 and resistor 72) permits current to momentarily flow through contacts 27A of relay 71 through lines 74 and 67 to energize relay 66 which then will be held by the current flowing through $B_1$, $B_2$, $B_3$, and contacts 66A. Contacts 27A then open to allow $B_1$, $B_2$, $B_3$, etc. to control relay 66. The resumption of power on relay 71 removes the steady signal at the remote unit 10.

In the operation of the refrigeration fault-sensing portion of the system, a unique double secondary is employed to provide 75 volts DC in order to power the neon tubes 75 and 76 while still providing 25 volts in the line running through the store 11, whereby the need for expensive conduits is avoided. Further, each neon tube 75 and 76 is associated with a diode to prevent current cross-over or feedback, the diodes being seen in the lower left-hand portion of FIG. 7 and designated 81 and 82, respectively. In addition to providing a visual signal at the monitor unit—which can be augmented by an aural signal through operation of the buzzer 92 (which may be the buzzer 63)—actuation of the primary refrigerator relay 86 results in actuation of the motor cam unit 21' to send a coded signal to the remote signal unit 10 by the selective closing of the switch 28.

While in the foregong specification a detailed description of an embodiment of the invention has been set down for the purpose of explanation, many variations in the details herein given may be made by those skilled in the art without departing from the spirit and scope of the invention.

We claim:
1. A system for detecting faults at a first station and reporting said faults at a remote station comprising: a source of EMF at said remote station, conductive means coupling said source to said first station, resistive means at said first station connected to said conductive means for setting a current in said conductive means to a first predetermined level, first current-sensing means including alarm means at said remote station responsive to said first level of current in said conductive means for generating a sensible alarm signal when said current in said conductive means is interrupted, a plurality of fault sensing means at said first station for detecting at least two different alarm conditions thereat, switching means at said first station connected in circuit with said resistive means and energized by said fault sensing means, each fault sensing means energizing said switching means at a repetition rate representative of the alarm condition sensed for transmitting an alarm current pulse signal of a second predetermined level through said conductive means to said remote station, and second current-sensing means including alarm means at said remote station for generating a sensible signal representative of the alarm condition detected at said first station in response to the repetition rate of said alarm current pulse signal.

2. The system of claim 1 wherein said conductive means comprises a single pair of wires.

3. The system of claim 1 wherein said fault sensing means at said first station comprises a fault detector for each condition monitored at said first station, a pair of energized contacts actuated by each fault detector and connected in circuit with said resistive means to periodically increase the current in said conductive means when actuated thereby generating said current pulse signal when said contacts are actuated by their associated fault detector, each fault detector for a different type of fault actuating its associated contacts at a different repetition rate whereby the repetition rate of said alarm current pulse detected by said second current-sensing means is indicative of the type of fault detected at said first station.

4. The system of claim 3 wherein said fault detectors comprise fire detection means for generating said periodic current pulse signal at a first repetition rate, burglary detection means for generating said periodic current pulse signal at a second repetition rate lower than said first repetition rate; and refrigeration detection means for generating said periodic current pulse signal at a third repetition rate lower than said second repetition rate whereby the higher repetition rates sensed at said remote location indicate priority of danger of the detected fault.

5. The system of claim 4 further comprising power-failure fault detector means for detecting a power failure at said first location, and a pair of contacts in circuit with said resistive means and actuated by said power failure fault detector means to increase the current level in said conductive means whereby said second current sensing means at said remote location energizes said alarm means constantly when a power failure is detected at said first location.

6. The system of claim 4 further including means for synchronizing said current pulse signals [characterized by said periodic signal being synchronized] whereby the more serious fault signal represented by the highest repetition rate of said second current pulse signal overrides the others.

7. The system of claim 6 wherein said synchronized, periodic signals are generated by a cam-operated mechanism comprising a cam for each repetition rate, all of said cams mounted on a common rotatable shaft driven by a motor and adapted to actuate an associated pair of contacts, each cam having a different number of contact operators whereby each cam actuates its associated contacts a different number of times per revolution of said shaft.

References Cited

UNITED STATES PATENTS

| | | | |
|---|---|---|---|
| 388,357 | 8/1888 | Guest | 340—409 |
| 2,728,074 | 12/1955 | Cesareo | 179—5 |
| 1,729,137 | 9/1929 | Stalmach | 340—409 |
| 2,116,947 | 5/1938 | Ketay | 340—409 |
| 2,439,331 | 4/1948 | Bean | 340—409 |
| 3,094,690 | 6/1963 | Voorhees | 340—409 |

THOMAS B. HABECKER, *Primary Examiner.*

U.S. Cl. X.R.

340—216, 416